(12) United States Patent
Shinohara

(10) Patent No.: US 8,248,704 B2
(45) Date of Patent: Aug. 21, 2012

(54) ZOOM LENS AND IMAGE PICKUP APPARATUS INCLUDING THE SAME

(75) Inventor: Kenji Shinohara, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 136 days.

(21) Appl. No.: 12/972,958

(22) Filed: Dec. 20, 2010

(65) Prior Publication Data

US 2011/0157718 A1    Jun. 30, 2011

(30) Foreign Application Priority Data

Dec. 25, 2009  (JP) .................................. 2009-294300

(51) Int. Cl.
*G02B 15/14*   (2006.01)
*G02B 27/04*   (2006.01)

(52) U.S. Cl. .......................... 359/684; 359/557; 359/676
(58) Field of Classification Search .................. 359/557, 359/676, 683, 684
See application file for complete search history.

(56) References Cited

U.S. PATENT DOCUMENTS

| | | | | |
|---|---|---|---|---|
| 7,830,612 B2 * | 11/2010 | Hagiwara | ..................... | 359/676 |
| 7,864,442 B2 * | 1/2011 | Yamashita | ..................... | 359/683 |
| 7,894,135 B2 * | 2/2011 | Nanba | ........................... | 359/557 |
| 7,920,332 B2 * | 4/2011 | Ohtake | ........................ | 359/676 |

FOREIGN PATENT DOCUMENTS

| | | |
|---|---|---|
| JP | 2000-180722 A | 6/2000 |
| JP | 2000-231050 A | 8/2000 |

* cited by examiner

*Primary Examiner* — David N Spector
(74) *Attorney, Agent, or Firm* — Rossi, Kimms & McDowell LLP

(57) ABSTRACT

A small zoom lens having a high zoom ratio and high optical performance over an entire zoom range is obtained. The zoom lens includes, in order from an object side to an image side: a first lens unit having a positive refractive power; a second lens unit having a negative refractive power; a third lens unit having a positive refractive power; a fourth lens unit having a negative refractive power; and a fifth lens unit having a positive refractive power, wherein intervals between the first lens unit, the second lens unit, the third lens unit, the fourth lens unit, and the fifth lens unit are changed during zooming, in which a focal length (fw) of an entire system at a wide angle end and a focal length (fn) of an n-th lens unit are set appropriately.

6 Claims, 11 Drawing Sheets

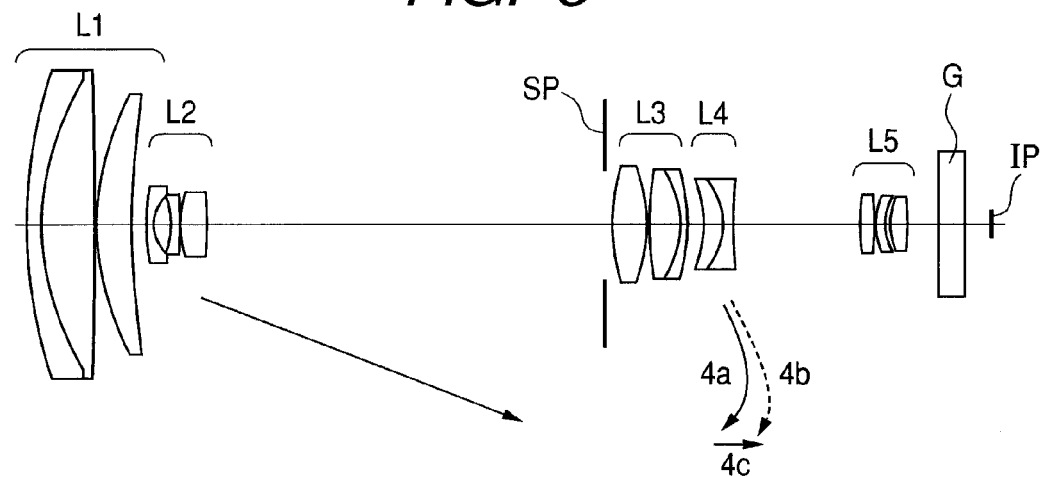
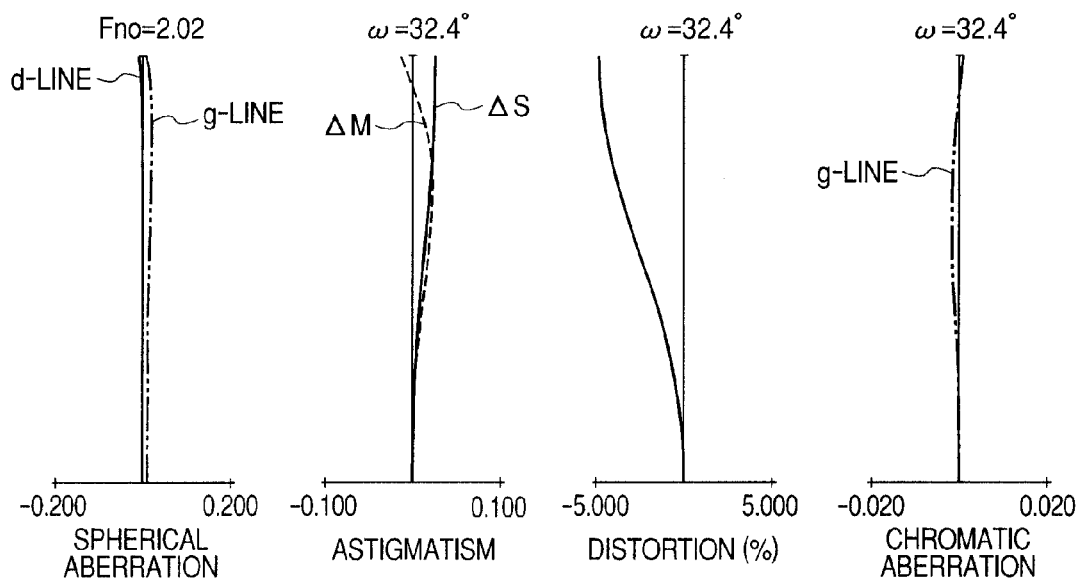

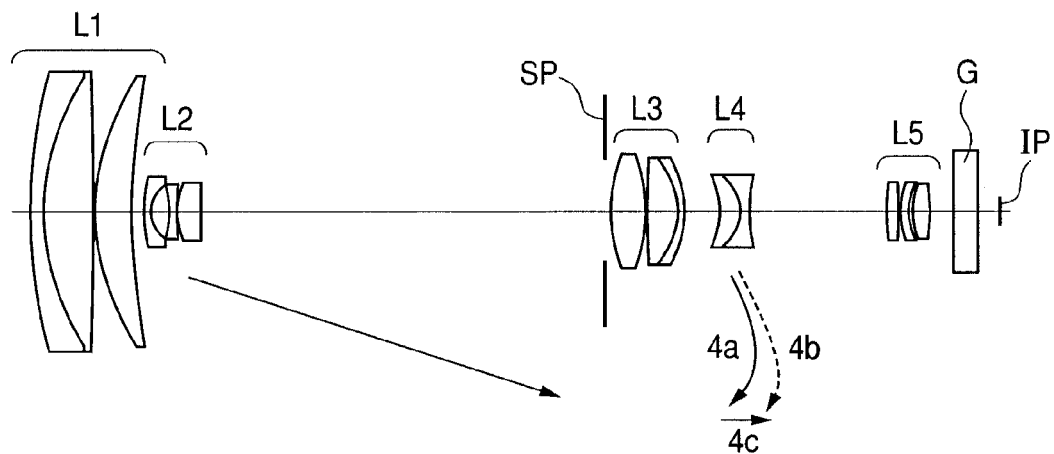
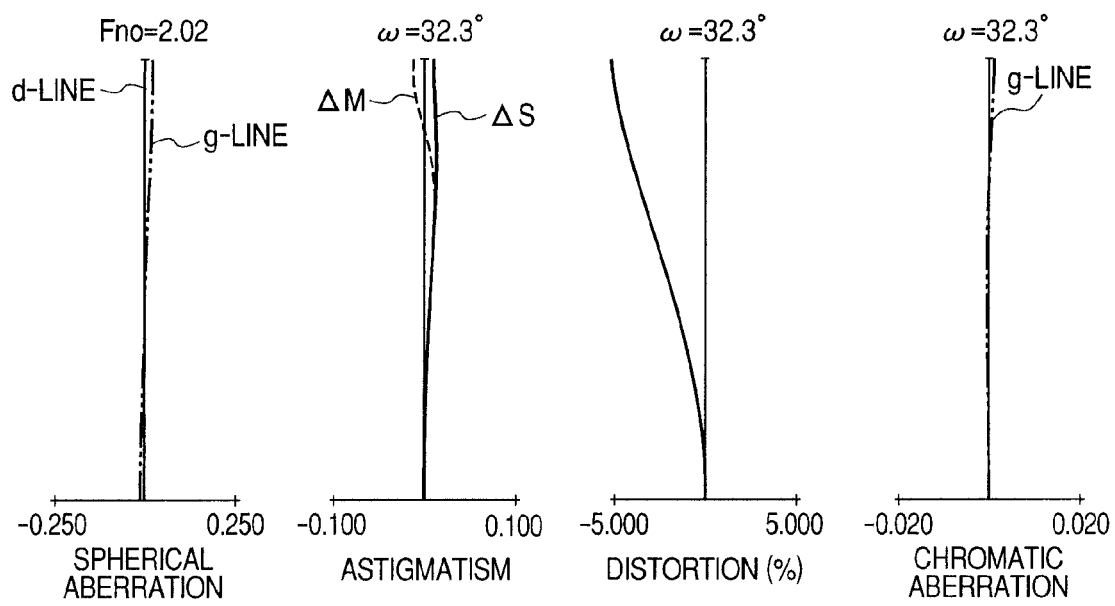

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitable for an image pickup apparatus using a solid-state image pickup element, such as a video camera, an electronic still camera, a broadcasting camera, or a monitor camera, or an image pickup apparatus such as a silver-halide film camera.

2. Description of the Related Art

In recent years, an image pickup apparatus using a solid-state image pickup element, such as a video camera, a digital still camera, a broadcasting camera, or a monitor camera, as well as a silver-halide film camera has high performance, and the entire apparatus is downsized. Then, an image taking optical system used for the image pickup apparatus is required to be a high-resolution zoom lens having a short total lens length, a compact (small) size, and a high zoom ratio (high magnification ratio). As a zoom lens which meets the requirements, there is known a positive-lead type zoom lens having a lens unit having a positive refractive power disposed on an object side. As the positive-lead type zoom lens, there is known a zoom lens constituted of five lens units namely, first to fifth lens units having positive, negative, positive, negative, and positive refractive powers arranged in order from the object side to an image side.

In the zoom lens described in Japanese Patent Application Laid-Open Nos. 2000-180722 and 2000-231050, a second lens unit is moved to the image side during zooming from a wide angle end to a telephoto end, and a fourth lens unit is moved along a locus convex toward the image side.

Generally in a zoom lens, in order to realize a small size of the entire system and a high zoom ratio, a refractive power of a main magnification lens unit needs to be enhanced so that a movement amount of the main magnification lens unit in zooming is increased. However, when the refractive power of the main magnification lens unit is enhanced so as to increase the movement amount, a high zoom ratio can be realized easily, but aberration variation in zooming is increased so that it is difficult to obtain high optical performance over the entire zoom range.

In the five-unit zoom lens described above, in order to realize a high zoom ratio, for example, a zoom ratio of 50 or larger, a small size of the entire lens system, and good optical performance, it is important to set appropriately a refractive power of each lens unit, and a move condition or the like of each lens unit in zooming. In particular, it is important to set appropriately move conditions of the second and fourth lens units in zooming and a refractive power (inverse number of a focal length) of each of a first lens unit, the second lens unit, and a fifth lens unit. If these structures are not set appropriately, it is very difficult to realize a small front lens effective diameter, to secure a high zoom ratio, and to obtain high optical performance over the entire zoom range.

SUMMARY OF THE INVENTION

A zoom lens according to the present invention includes, in order from an object side to an image side: a first lens unit having a positive refractive power; a second lens unit having a negative refractive power; a third lens unit having a positive refractive power; a fourth lens unit having a negative refractive power; and a fifth lens unit having a positive refractive power, wherein intervals between the first lens unit, the second lens unit, the third lens unit, the fourth lens unit, and the fifth lens unit are changed during zooming, in which the following conditional expressions are satisfied:

$9.8 < |f1/f2| < 12.5$; and $5.0 < f5/fw < 7.5$;

where fw denotes a focal length of an entire system at a wide angle end, and fn denotes a focal length of an n-th lens unit.

According to the present invention, a small zoom lens having a high zoom ratio and high optical performance over an entire zoom range can be obtained.

Further features of the present invention will become apparent from the following description of exemplary embodiments with reference to the attached drawings.

BRIEF DESCRIPTION OF THE DRAWINGS

FIG. 5 is a lens cross section at a wide angle end according to a third embodiment of the present invention.

FIGS. 6A, 6B and 6C are aberration diagrams at a wide angle end, an intermediate zoom position, and a telephoto end, respectively, of a zoom lens according to the third embodiment of the present invention.

FIG. 9 is a lens cross section at a wide angle end according to a fifth embodiment of the present invention.

FIGS. 10A, 10B and 10C are aberration diagrams at a wide angle end, an intermediate zoom position, and a telephoto end, respectively, of a zoom lens according to the fifth embodiment of the present invention.

DESCRIPTION OF THE EMBODIMENTS

Hereinafter, exemplary embodiments of the present invention are described in detail with reference to the attached drawings. A zoom lens of the present invention includes a first lens unit having a positive refractive power, a second lens unit having a negative refractive power, a third lens unit having a positive refractive power, a fourth lens unit having a negative refractive power, and a fifth lens unit having a positive refractive power, arranged in order from an object side to an image side.

Intervals among lens units change during zooming. There may be a case in which a lens unit having a refractive power is disposed on at least one of an object side of the first lens unit and an image side of the fifth lens unit.

Figure 1:
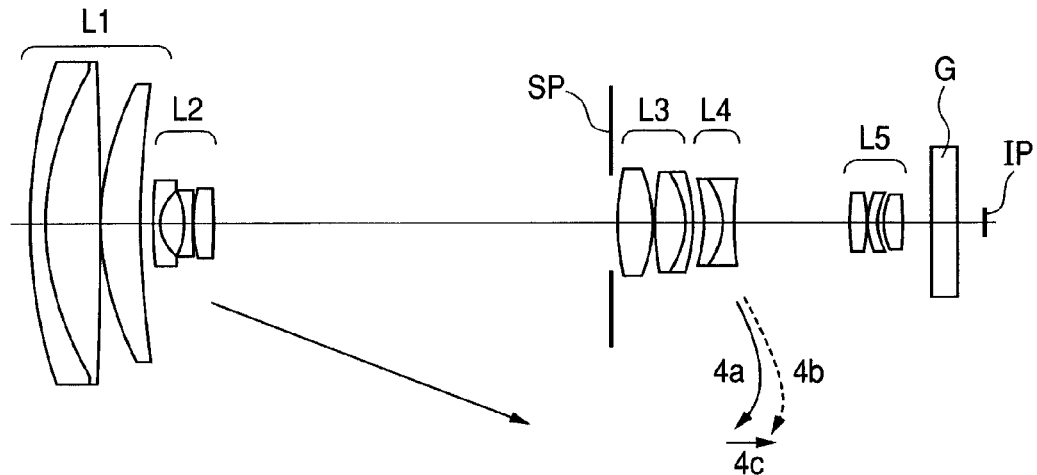
FIG. 1 is a lens cross section at a wide angle end according to a first embodiment of the present invention.
Figure 2A:
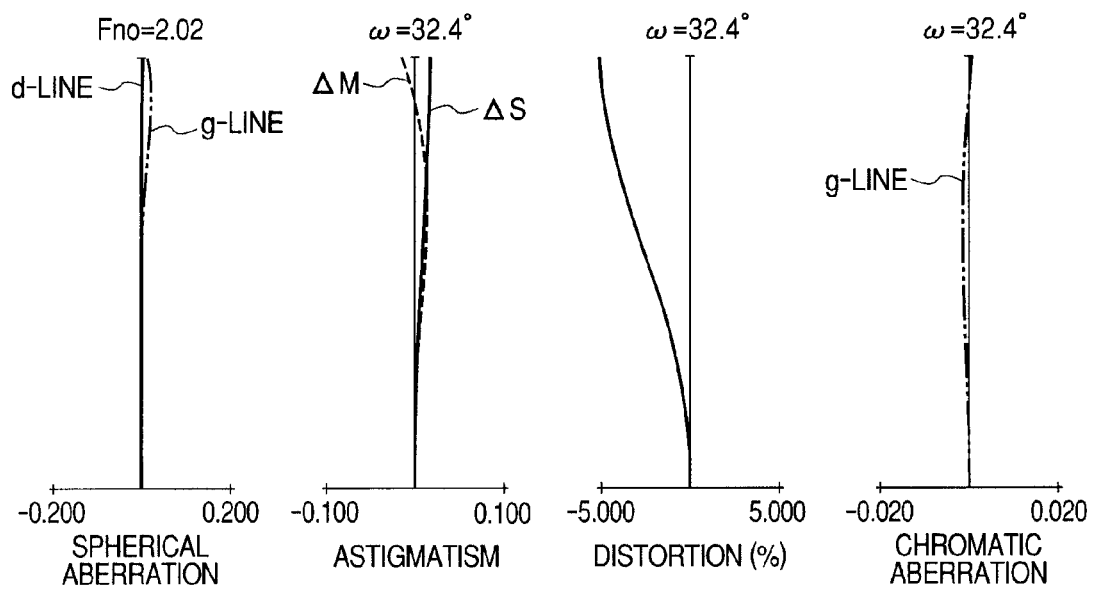
FIGS. 2A, 2B and 2C are aberration diagrams at a wide angle end, an intermediate zoom position, and a telephoto end, respectively, of a zoom lens according to the first embodiment of the present invention.
Figure 2B:
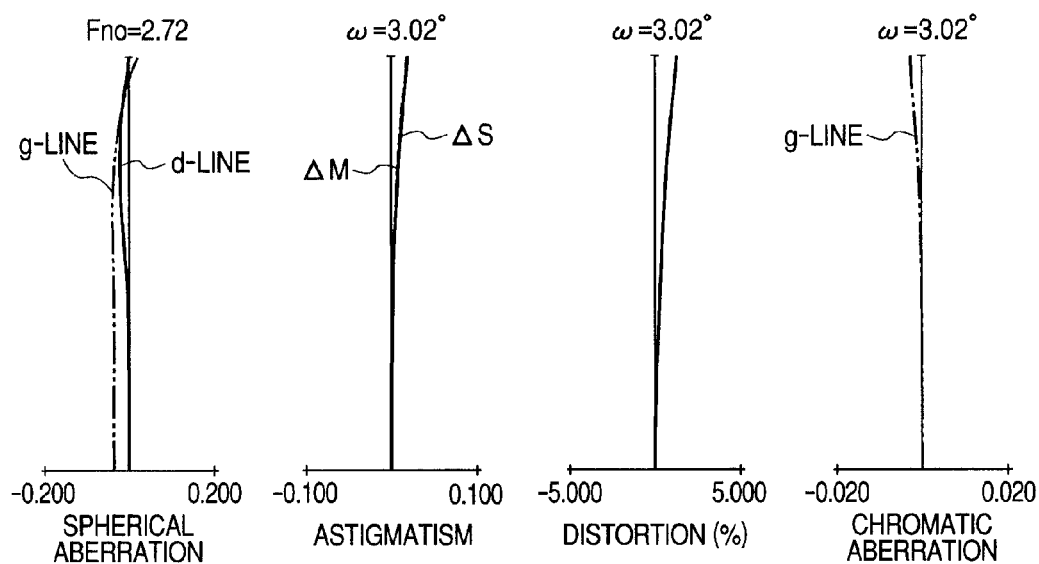
Figure 2C:
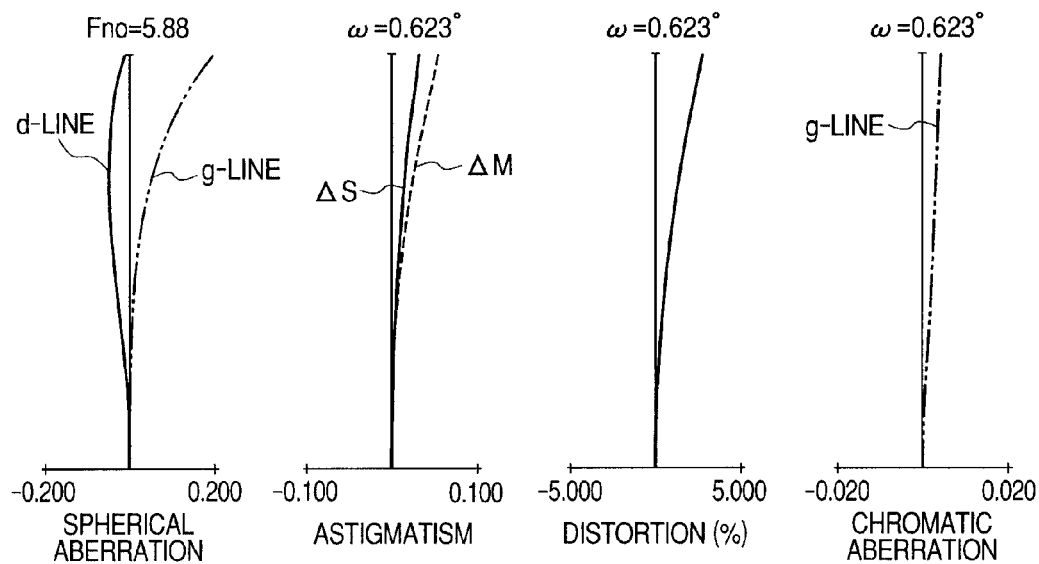

FIG. 1 illustrates a lens cross section at a wide angle end (short focal length end) of a zoom lens according to a first embodiment of the present invention. FIGS. 2A to 2C are aberration diagrams at a wide angle end, an intermediate zoom position, and a telephoto end (long focal length end), respectively, of the zoom lens of the first embodiment. The zoom lens of the first embodiment has a zoom ratio of 58.43 and an aperture ratio (F number) of 2.02 to 5.27.

Figure 3:
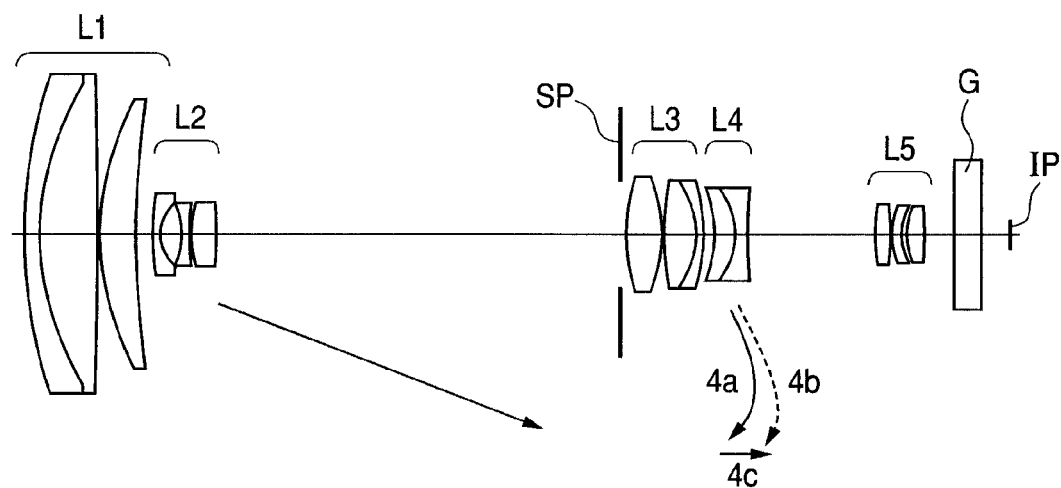
FIG. 3 is a lens cross section at a wide angle end according to a second embodiment of the present invention.
Figure 4A:
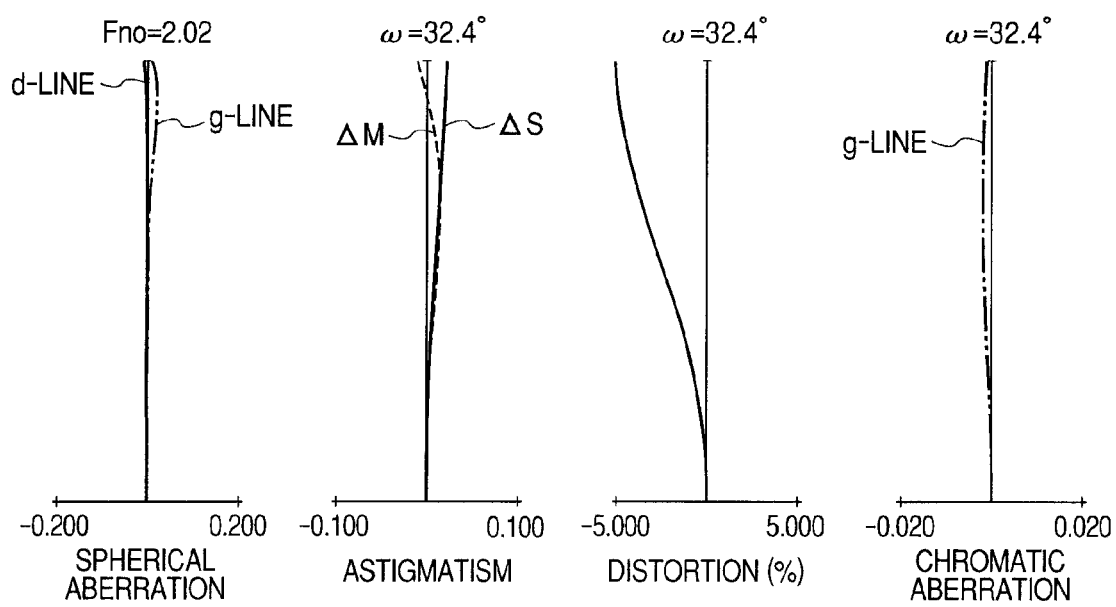
FIGS. 4A, 4B and 4C are aberration diagrams at a wide angle end, an intermediate zoom position, and a telephoto end, respectively, of a zoom lens according to the second embodiment of the present invention.
Figure 4B:
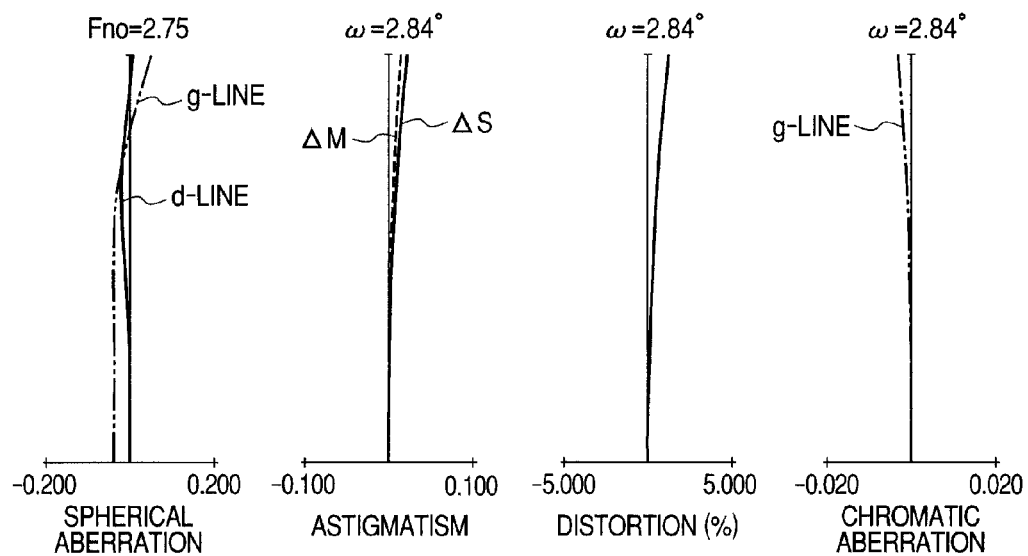
Figure 4C:
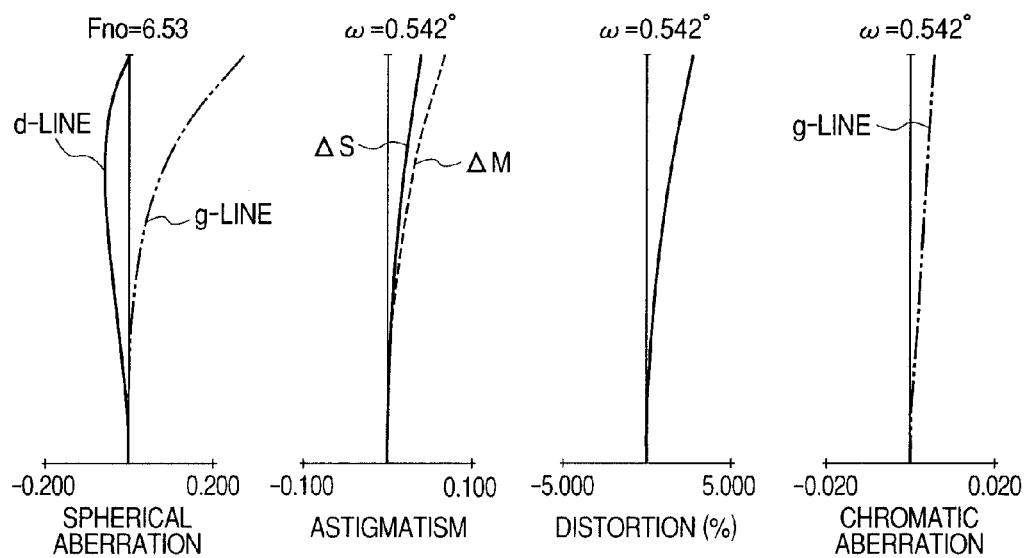

FIG. 3 illustrates a lens cross section at a wide angle end of a zoom lens according to a second embodiment of the present invention. FIGS. 4A to 4C are aberration diagrams at a wide angle end, an intermediate zoom position, and a telephoto end, respectively, of the zoom lens of the second embodiment. The zoom lens of the second embodiment has a zoom ratio of 67.20 and an aperture ratio of 2.02 to 6.53.

Figure 6B:
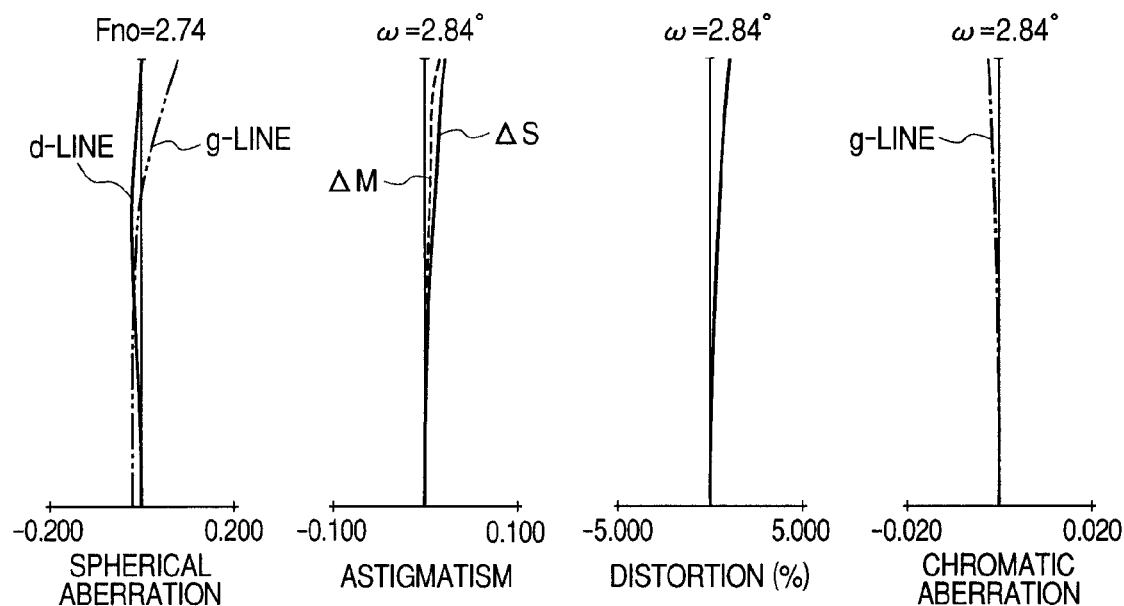
Figure 6C:
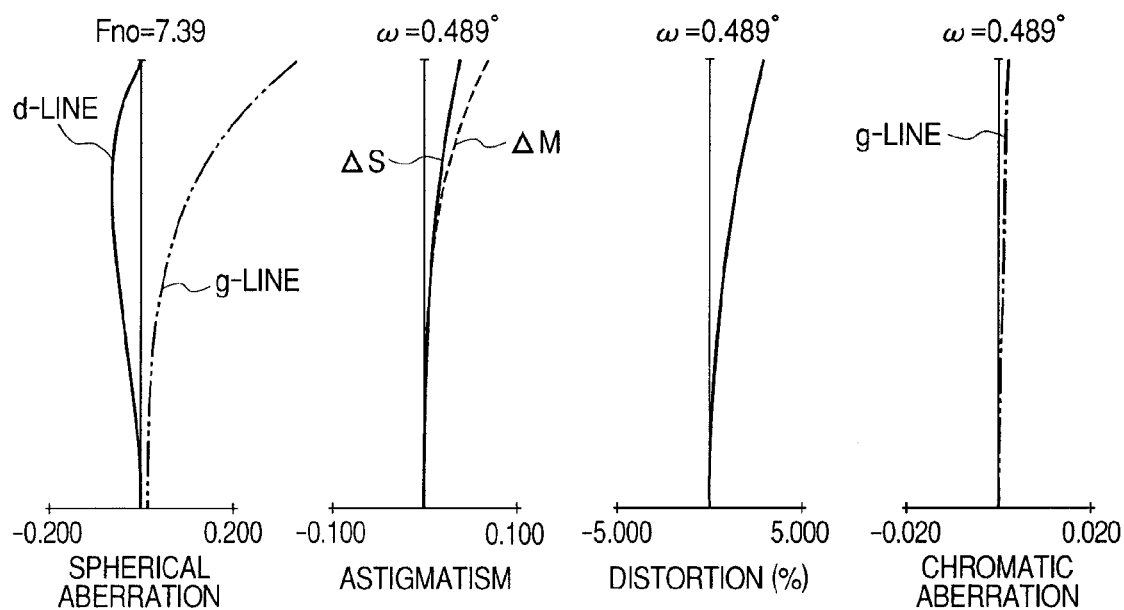

FIG. 5 illustrates a lens cross section at a wide angle end of a zoom lens according to a third embodiment of the present invention. FIGS. 6A to 6C are aberration diagrams at a wide angle end, an intermediate zoom position, and a telephoto end, respectively, of the zoom lens of the third embodiment. The zoom lens of the third embodiment has a zoom ratio of 74.40 and an aperture ratio of 2.02 to 7.39.

Figure 7:
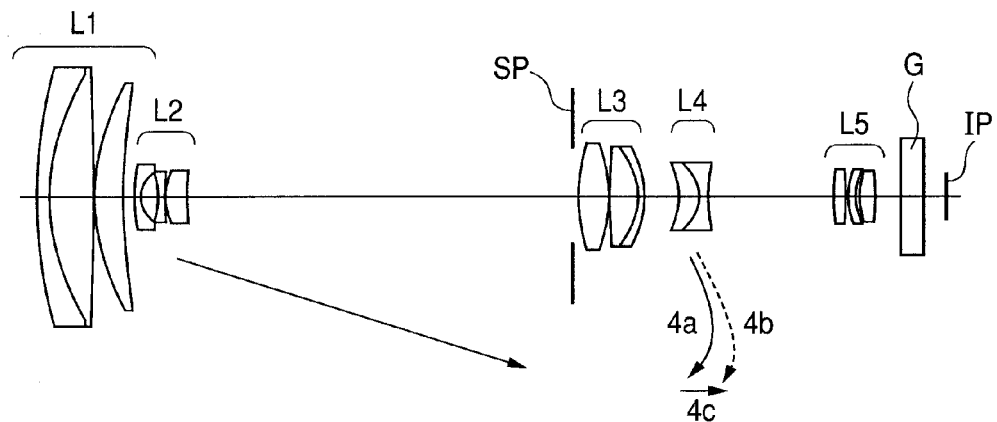
FIG. 7 is a lens cross section at a wide angle end according to a fourth embodiment of the present invention.
Figure 8A:
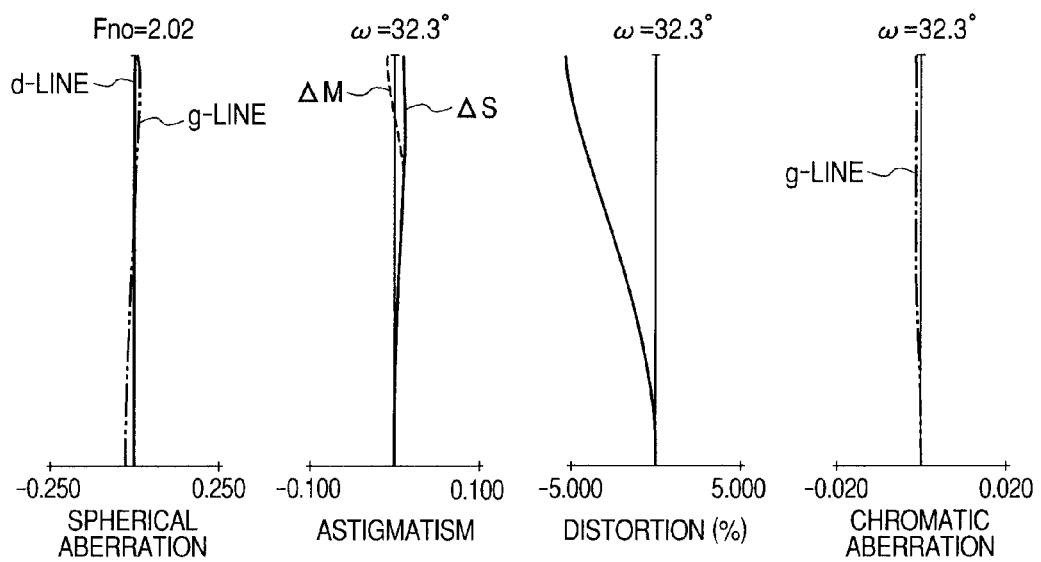
FIGS. 8A, 8B and 8C are aberration diagrams at a wide angle end, an intermediate zoom position, and a telephoto end, respectively, of a zoom lens according to the fourth embodiment of the present invention.
Figure 8B:
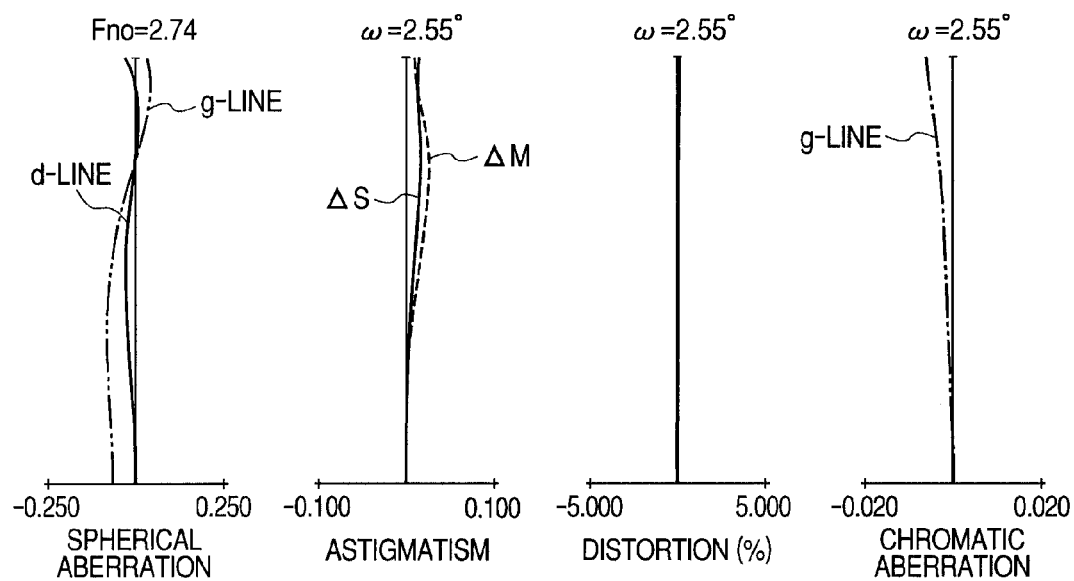
Figure 8C:
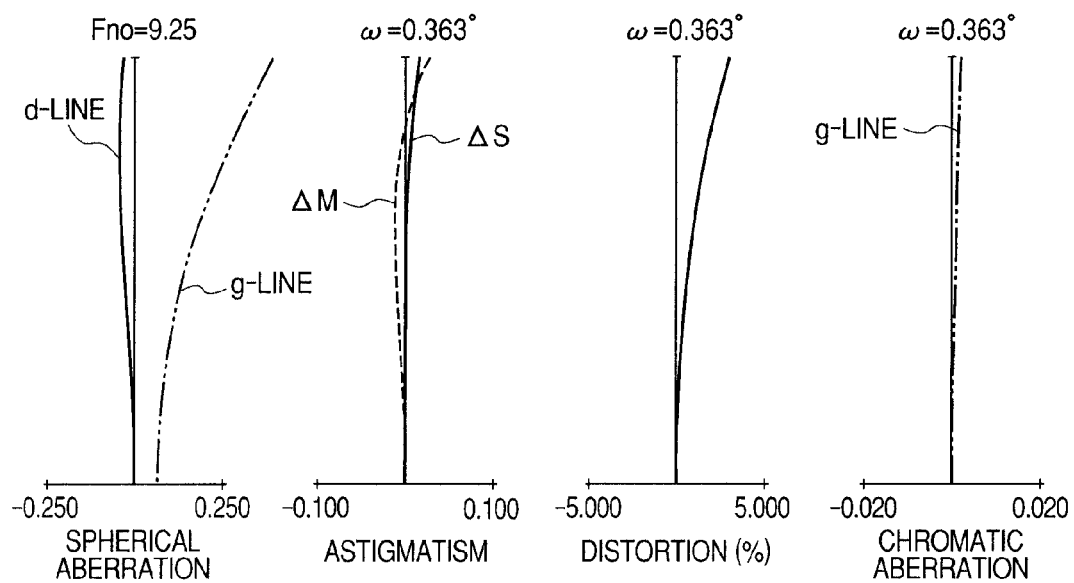

FIG. 7 illustrates a lens cross section at a wide angle end of a zoom lens according to a fourth embodiment of the present invention. FIGS. 8A to 8C are aberration diagrams at a wide angle end, an intermediate zoom position, and a telephoto end, respectively, of the zoom lens of the fourth embodiment. The zoom lens of the fourth embodiment has a zoom ratio of 99.73 and an aperture ratio of 2.02 to 9.25.

Figure 10B:
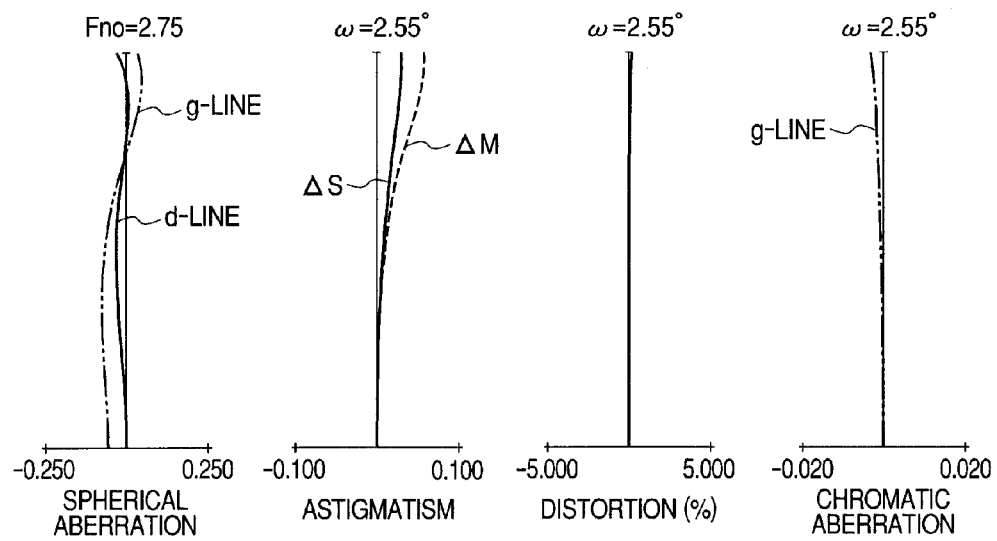
Figure 10C:
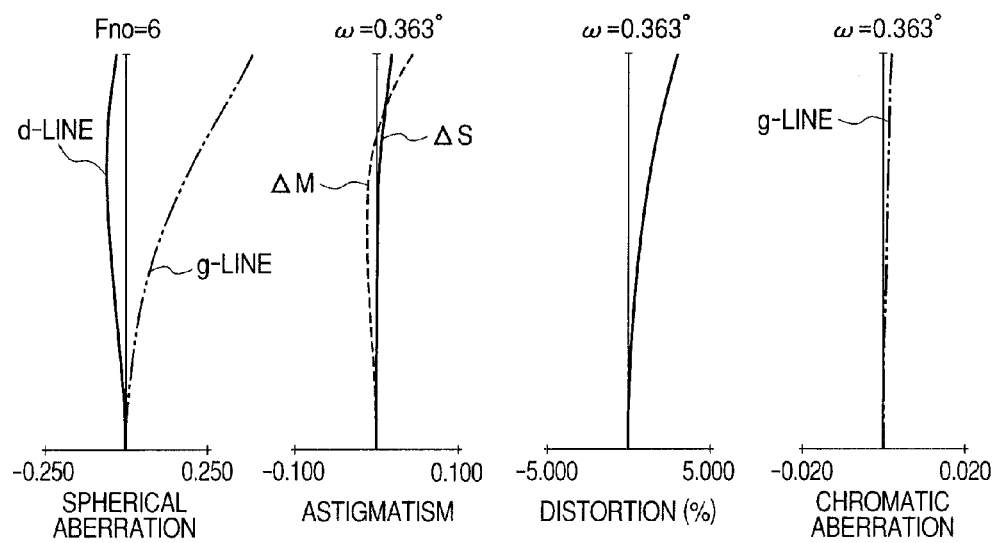
Figure 11:
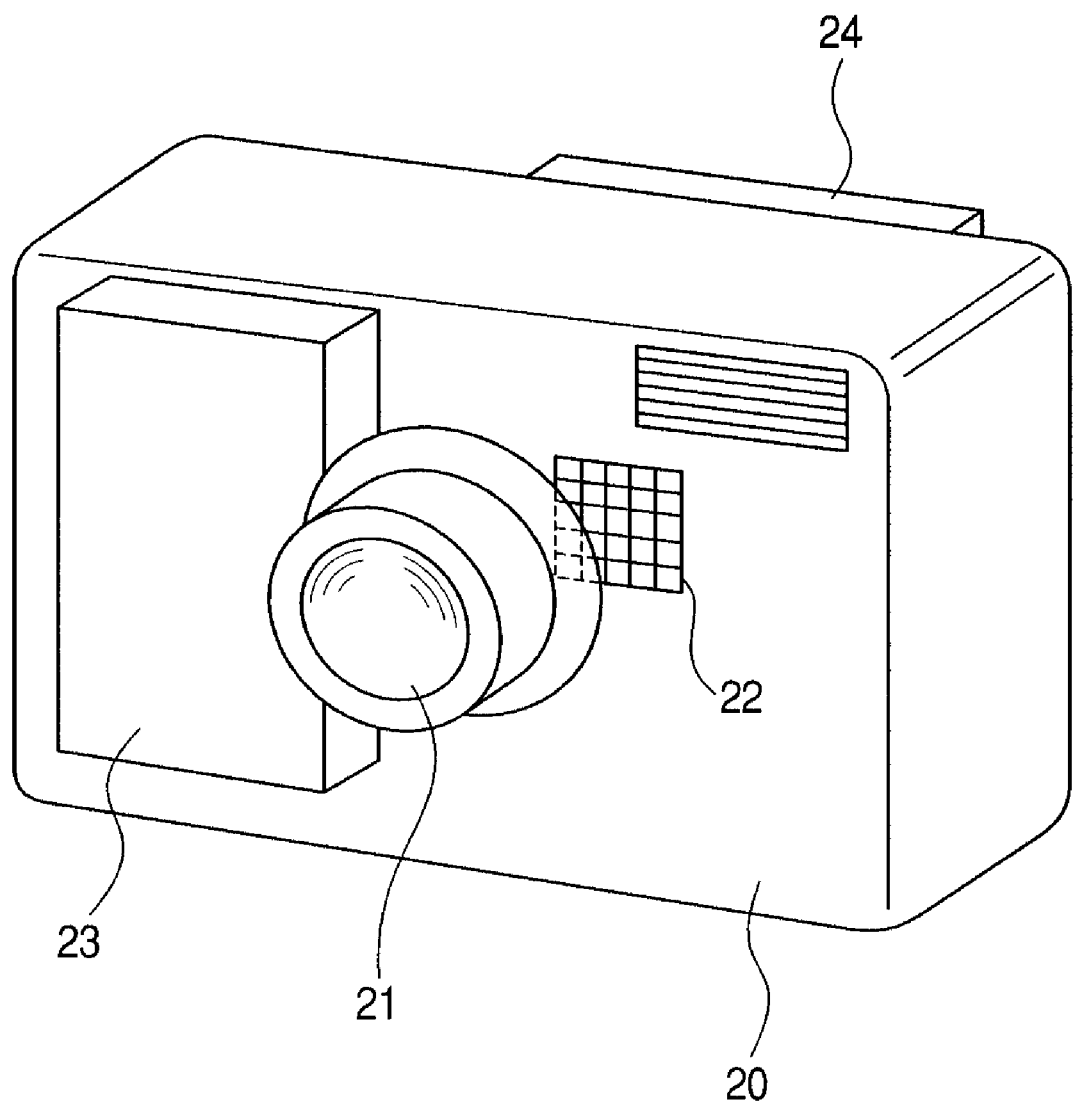
FIG. 11 is a schematic view of a main part of an image pickup apparatus according to the present invention.

FIG. 9 illustrates a lens cross section at a wide angle end of a zoom lens according to a fifth embodiment of the present invention. FIGS. 10A to 10C are aberration diagrams at a wide angle end, an intermediate zoom position, and a telephoto end, respectively, of the zoom lens of the fifth embodiment. The zoom lens of the fifth embodiment has a zoom ratio of 99.72 and an aperture ratio of 2.02 to 8.00. FIG. 11 is a schematic view of a main part of an image pickup apparatus according to the present invention. The zoom lens of the present invention is used for an image pickup apparatus such as a digital camera, a video camera, or a silver-halide film camera, as well as an observation device such as a telescope or binocular, or optical equipment such as a copying machine or a projector. In the lens cross sections, the left side is a front side (object side or magnification side) while the right side is a rear side (image side or reduction side). In the lens cross sections, i indicates an order of lens units from the object side to the image side, and Li represents an i-th lens unit.

Next, features of the zoom lens of each embodiment are described. In the lens cross section of each embodiment, the zoom lens includes a first lens unit L1 of a positive refractive power (optical power is an inverse number of a focal length), a second lens unit L2 of a negative refractive power, a third lens unit L3 of a positive refractive power, a fourth lens unit L4 of a negative refractive power, and a fifth lens unit L5 of a positive refractive power. An F number decision member (hereinafter referred to as an "aperture stop") SP has a function of aperture stop for deciding (limiting) an open F number (Fno) light flux. The F number decision member SP is positioned on the object side of the third lens unit L3.

An optical block G corresponds to an optical filter, a face plate, a quartz low-pass filter, an infrared cut filter, or the like. As an image plane IP, an imaging plane of an image pickup element (photoelectric transducer) such as a CCD sensor or a CMOS sensor is disposed when the zoom lens is used as an image taking optical system such as a video camera or a digital still camera. Alternatively, a photosensitive surface corresponding to a film surface is disposed when the zoom lens is used as an image taking optical system of a silver-halide film camera.

In the aberration diagrams, d and g denote a d-line and a g-line, respectively. ΔM and ΔS denote a meridional image plane and a sagittal image plane, respectively. G-line represents lateral chromatic aberration. Fno denotes an F number, and ω denotes a half field angle. The arrow indicates a moving locus of each lens unit during zooming from the wide angle end to the telephoto end. During zooming, at the telephoto end with respect to the wide angle end, the interval between the first lens unit and the second lens unit increases, the interval between the second lens unit and the third lens unit decreases, and the interval between the third lens unit and the fourth lens unit changes. Further, the second lens unit and the fourth lens unit move so that the interval between the fourth lens unit and the fifth lens unit changes.

Other than that, if the intervals among lens units change during zooming, any lens unit may be moved for zooming. Note that, in the following embodiments, the wide angle end and the telephoto end mean zoom positions when the magnification lens unit is positioned at each end of a mechanically movable range on the optical axis.

In each embodiment, during zooming from the wide angle end to the telephoto end, as illustrated by the arrow, the second lens unit L2 is moved to the image side so as to perform magnification. In addition, the fourth lens unit L4 is moved along a locus convex toward the image side so as to correct image plane variation accompanying magnification.

In addition, a rear focus method is adopted, in which the fourth lens unit L4 is moved on the optical axis for performing focusing. A solid line curve 4a and a dot line curve 4b concerning the fourth lens unit L4 indicate moving loci for correcting image plane variation accompanying magnification when an infinite object is in focus and when a short distance object is in focus, respectively. In this way, the fourth lens unit L4 is moved along a locus convex toward the image side, and hence a space between the fourth lens unit L4 and the fifth lens unit L5 can be used effectively, and reduction of the entire lens length (distance from the first lens surface to the image plane) is achieved effectively. In addition, when focusing on from an infinite object to a short distance object at the telephoto end, the fourth lens unit L4 is moved to the rear side as illustrated by the arrow 4c. Note that, the first lens unit L1 does not move in the optical axis direction for focusing, but the first lens unit L1 may be moved if necessary for correcting aberration. In addition, the fourth lens unit L4 is moved so as to have a component perpendicular to the optical axis. Thus, an imaging position is moved in the direction perpendicular to the optical axis. In other words, image stabilization is performed. The aperture stop SP does not move.

In general, in order to realize high zoom ratio in a zoom lens, movement amount of the lens unit for magnification increases. In addition, in order to realize a small size of the entire system of the zoom lens while realizing a high zoom ratio, it is important to suppress an incident angle of an off-axis light beam from the front lens side to the aperture stop for suppressing an increase of the front lens effective diameter. Therefore, the zoom lens of the present invention has a five-unit structure including, in order from the object side to the image side, positive, negative, positive, negative, and positive refractive power lens units, so as to realize a high zoom ratio. Then, downsizing of the front lens effective diameter is facilitated by setting a focal length determining the front lens effective diameter to be shifted to the zoom position on the telephoto side. In addition, for adopting the five-unit zoom lens, reducing spherical aberration at the telephoto end accompanying a high zoom ratio, and relieving an increasing size due to an increase of a stroke of the lens unit for magnification, a ratio between power of the first lens unit L1 and power of the second lens unit L2 is set appropriately. Further, in order to suppress variation of chromatic aberration by the first lens unit L1 and the second lens unit L2 accompanying a high zoom ratio in the five-unit zoom lens, power of the fifth lens unit L5 is set appropriately.

Specifically, in the zoom lens according to the present invention, the focal length of the entire system of the zoom lens at the wide angle end is denoted by fw, and the focal length of the n-th lens unit is denoted by fn.

In this case, the following conditional expressions are satisfied.

$$9.8<|f1/f2|<12.5 \quad (1)$$

$$5.0<f5/fw<7.5 \quad (2)$$

Next, technical meanings of the conditional expressions (1) and (2) are described. The conditional expression (1) is an conditional expression concerning power distribution (refractive power distribution) between the first lens unit L1 and the second lens unit L2, particularly for maintaining good optical performance at the telephoto end while realizing a small size of the entire system of the zoom lens. Below the lower limit value of the conditional expression (1), power of the first lens unit L1 increases. Therefore, it becomes difficult to correct appropriately spherical aberration and longitudinal chromatic aberration at the telephoto end. On the other hand, above the upper limit value, power of the second lens unit L2 increases. Therefore, a stroke amount during magnification is decreased, and hence downsizing is facilitated, but it becomes difficult to suppress variation of field curvature during zooming.

The conditional expression (2) is a conditional expression concerning power distribution of the fifth lens unit L5, particularly for correcting lateral chromatic aberration appropriately. Below the lower limit value of the conditional expression (2), power of the fifth lens unit L5 is increased, which is preferred for correcting the lateral chromatic aberration appropriately, but it becomes difficult to correct the coma aberration in the entire zoom range. On the other hand, above the upper limit value, power of the fifth lens unit L5 is decreased, and hence it becomes difficult to correct appropriately lateral chromatic aberration in the entire zoom range. In each embodiment, it is more preferred to set the numerical value ranges of the conditional expressions (1) and (2) as follows.

$$9.85<|f1/f2|<12.40 \quad (1a)$$

$$5.05<f5/fw<7.40 \quad (2a)$$

In addition, it is more preferred to set the numerical value ranges of the conditional expressions (1a) and (2a) as follows.

$$9.9<|f1/f2|<12.3 \quad (1b)$$

$$5.1<f5/fw<7.3 \quad (2b)$$

In each embodiment, with the structure described above, the small zoom lens is obtained, which has a high zoom ratio and high optical performance over the entire zoom range. In each embodiment, it is more preferred to satisfy one or more of the following conditions. The average refractive index of a material of the lenses constituting the second lens unit L2 is denoted by nd2. The Abbe number of a material of at least one positive lens of the first lens unit L1 is denoted by vdi. In this case, it is preferred to satisfy one or more of the following conditional expressions.

$$-6.5<f4/fw<-4.5 \quad (3)$$

$$nd2>1.86 \quad (4)$$

$$vdi>75 \quad (5)$$

The conditional expression (3) is a conditional expression concerning power distribution of the fourth lens unit L4 and is for reducing variation of field curvature. Above the upper limit value of the conditional expression (3), power of the fourth lens unit L4 is increased, and hence movement amount during zooming and movement amount during focusing are decreased, which is advantageous for reducing the entire lens length, but variation of field curvature during zooming increases inappropriately.

On the other hand, below the lower limit value, power of the fourth lens unit L4 is decreased, and hence the movement amounts of the fourth lens unit L4 during zooming and focusing increase. Therefore, the entire lens length increases inappropriately.

The conditional expression (4) is a conditional expression concerning a material of the lens of the second lens unit L2, for correcting the field curvature appropriately. Below the lower limit value of the conditional expression (4), the Petzval sum increases in the negative direction. Therefore, it becomes difficult to suppress variation of the field curvature during zooming. In addition, if power of the second lens unit L2 is decreased so as to suppress variation of the field curvature, the entire lens length increases, and the front lens effective diameter increases inappropriately.

The conditional expression (5) is a conditional expression concerning a material of at least one positive lens of the first lens unit L1, particularly for correcting longitudinal chromatic aberration at the telephoto end. Below the lower limit value of the conditional expression (5), it becomes difficult to correct the longitudinal chromatic aberration appropriately at the telephoto end. In each numerical embodiment, it is more preferred to set the numerical value ranges of the conditional expressions (3) to (5) as follows.

$$-6.45<f4/fw<-4.55 \quad (3a)$$

$$2.100>nd2>1.865 \quad (4a)$$

$$98>vdi>77 \quad (5a)$$

It is still more preferred to set the numerical value ranges of the conditional expressions (3a) to (5a) as follows.

$$-6.4<f4/fw<-4.6 \quad (3b)$$

$$2.00>nd2>1.87 \quad (4b)$$

$$96>vdi>79 \quad (5b)$$

In each embodiment, by constituting each lens unit as described above, the entire lens system is downsized. Thus, with simple lens structure, it is possible to obtain a high zoom ratio and high optical performance over the entire zoom range and the entire object distance range. For instance, a zoom lens supporting a high zoom ratio of 50 or larger can be obtained.

Next, a lens structure of each lens unit is described. Hereinafter, unless otherwise noted, the order is from the object side to the image side. The first lens unit L1 is constituted of a cemented lens including a negative lens and a positive lens that are cemented, and a positive lens having a meniscus shape with a convex surface on the object side. In the zoom lens of each embodiment, a refractive power of the first lens unit L1 is enhanced so as to realize a small size and a high zoom ratio. In this case, various aberrations are generated in the first lens unit L1, and particularly at the telephoto side, large spherical aberration is generated. Therefore, a positive refractive power of the first lens unit L1 is shared by the cemented lens and the positive lens, and hence generation of the various aberrations is reduced. Note that, a low dispersion material having an Abbe number larger than 75 is used for the positive lens on the object side. Thus, the longitudinal chromatic aberration and the lateral chromatic aberration are corrected appropriately on the telephoto side.

The second lens unit L2 is constituted of a negative lens having a lens surface of a concave shape on the image side, a negative lens having a concave shape on both sides, and a positive lens having a lens surface of a convex shape on the object side, in which the absolute value of a refractive power on the image side is larger than that on the object side. In the zoom lens of each embodiment, the refractive power of the second lens unit L2 is enhanced so as to obtain a wide field angle at the wide angle end with a small effective diameter of the first lens unit L1. In this case, various aberrations are generated in the second lens unit L2, and particularly at the wide angle side, large spherical aberration is generated. In each embodiment, the negative refractive power of the second lens unit L2 is shared by the two negative lenses so as to reduce generation of the various aberrations. With this lens structure, a wider field angle, a reduction of the front lens effective diameter, and high optical performance are obtained. Note that, a high dispersion material having an Abbe number smaller than 20 is used for the positive lens, and hence the refractive power of each lens of the second lens unit L2 which is necessary for achromatization is set to be as small as possible. Thus, the number of lenses is reduced so as to realize a small size.

The third lens unit L3 is constituted of a positive lens having a lens surface of a convex shape on the object side, and a cemented lens including a positive lens and a negative lens that are cemented. The refractive power of the third lens unit L3 is enhanced so as to increase the magnification action of the third lens unit L3 and decrease the entire lens length at the wide angle end. In this case, various aberrations are generated in the third lens unit L3, and particularly over the entire zoom range, large spherical aberration, coma aberration, and longitudinal chromatic aberration are generated. Therefore, the positive refractive power of the third lens unit L3 is shared by the two positive lenses so as to reduce generation of the various aberrations.

The fourth lens unit L4 is constituted of a cemented lens including a positive lens and a negative lens that are cemented. In each embodiment, the fourth lens unit L4 is constituted of a small number of lenses, so as to realize a thin profile and light weight. Note that, a low dispersion material having a relatively large Abbe number (55 or larger) is used for the negative lens so that chromatic aberration variation accompanying magnification is reduced. The fifth lens unit L5 is constituted of a positive lens, a negative lens, and a positive lens. Thus, even if the refractive power of the fifth lens unit L5 is enhanced, generation of the lateral chromatic aberration can be suppressed over the entire zoom range.

In each embodiment, with the structure of each lens unit as described above, it is possible to obtain the zoom lens that supports a high zoom ratio of 50 or larger, has a small size over the entire system of the zoom lens, and high optical performance over the entire zoom range and over the entire object distance.

Next, an embodiment of a digital still camera that includes the zoom lens as described above in each embodiment as an image taking optical system is described with reference to FIG. 11. In FIG. 11, the digital still camera includes a camera main body 20, and an image taking optical system 21 constituted of any one of the zoom lenss described above in the first to fifth embodiments. The camera main body 20 includes a solid-state image pickup element (photoelectric transducer) 22 such as a CCD sensor or a CMOS sensor, which receives light of a subject image formed by the image taking optical system 21. A memory 23 stores information corresponding to the subject image after photoelectric conversion by the solid-state image pickup element 22. A finder 24 is constituted of a liquid crystal display panel or the like and is used for observing the subject image formed on the solid-state image pickup element 22. In this way, by applying the zoom lens according to the present invention to the image pickup apparatus such as a digital still camera, it is possible to realize the image pickup apparatus having a small size and high optical performance.

Next, Numerical Embodiments corresponding to the embodiments of the present invention are described. In each Numerical Embodiment, i denotes an order of a surface from the object side. In each Numerical Embodiment, ri denotes a curvature radius of the i-th lens surface counted from the object side. Symbol di denotes i-th lens thickness and air distance counted from the object side. Symbols ndi and vdi respectively denote a refractive index and Abbe number of the i-th material glass counted from the object side with respect to the d-line. The last two surfaces are the glass block. An aspheric shape is expressed by Equation 1 below:

$$X = \frac{(1/R)H^2}{1+\sqrt{1-(1+K)(H/R)^2}} + A4 \times H^4 + A6 \times H^6 + A8 \times H^8 + A10 \times H^{10}$$ [Equation 1]

where the X axis corresponds to the optical axis direction, the H axis corresponds to the direction perpendicular to the optical axis, the light propagation direction is positive, R denotes a paraxial curvature radius, K denotes a conic constant, and A4, A6, A8, and A10 denote aspheric coefficients, respectively. In addition, [e+X] means [×10$^{+X}$], and [e−X] means [×10$^{−X}$]. BF denotes back focus, which is obtained by air conversion of a distance between a lens end surface and a paraxial image plane (back focus). The total lens length is a distance between a lens front surface and the lens end surface plus the back focus BF. The aspheric surface is indicated by adding * as a suffix to surface number. A relationship among conditional expressions described above and various numerical values in Numerical Embodiments is shown in Table 1.

| (Numerical Embodiment 1) | | | | |
|---|---|---|---|---|
| Surface data | | | | |
| Surface Number | r | d | nd | vd |
| 1 | 21.815 | 0.58 | 1.84666 | 23.8 |
| 2 | 12.127 | 2.03 | 1.49700 | 81.5 |
| 3 | −220.967 | 0.08 | | |
| 4 | 12.445 | 1.46 | 1.80400 | 46.6 |
| 5 | 37.656 | (Variable) | | |
| 6 | 12.670 | 0.28 | 1.88300 | 40.8 |
| 7 | 1.787 | 0.86 | | |
| 8 | −3.096 | 0.28 | 1.88300 | 40.8 |
| 9 | 10.475 | 0.08 | | |

(Numerical Embodiment 1)

| | | | | |
|---|---|---|---|---|
| 10 | 5.947 | 0.75 | 1.92286 | 18.9 |
| 11 | −12.992 | (Variable) | | |
| 12 (Stop) | ∞ | 0.24 | | |
| 13* | 8.591 | 1.28 | 1.58313 | 59.4 |
| 14* | −6.285 | 0.09 | | |
| 15 | 12.198 | 1.08 | 1.53927 | 64.7 |
| 16 | −3.745 | 0.28 | 1.84666 | 23.8 |
| 17 | −7.190 | (Variable) | | |
| 18 | −5.797 | 0.67 | 1.62987 | 30.5 |
| 19 | −3.046 | 0.39 | 1.58313 | 59.4 |
| 20* | 9.509 | (Variable) | | |
| 21 | 13.123 | 0.60 | 1.48749 | 70.2 |
| 22 | −9.360 | 0.08 | | |
| 23 | 4.237 | 0.33 | 1.84666 | 23.8 |
| 24 | 2.347 | 0.20 | | |
| 25 | 3.680 | 0.68 | 1.69680 | 55.5 |
| 26 | −25.645 | 1.10 | | |
| 27 | ∞ | 1.04 | 1.51633 | 64.2 |
| 28 | ∞ | 1.02 | | |
| Image plane | ∞ | | | |

Aspherical Surface data

Thirteenth surface $K = -1.59564e+000$ $A4 = -7.39010e-004$ $A6 = 1.33976e-004$
$A8 = -4.30989e-005$ $A10 = 4.35545e-006$ Fourteenth surface $K = -1.97071e+000$ $A4 = -5.89834e-004$ $A6 = -5.77593e-006$
$A8 = -5.82490e-006$ Twentieth surface $K = -1.86048e+001$ $A4 = -2.82783e-004$ $A6 = -3.50267e-004$
$A8 = 2.08345e-005$

Various data
Zoom ratio 58.43

| | | | |
|---|---|---|---|
| Focal length | 1.00 | 12.06 | 58.43 |
| F number | 2.02 | 2.72 | 5.27 |
| Half field angle | 32.43 | 3.02 | 0.62 |
| Image height | 0.64 | 0.64 | 0.64 |
| Total lens length | 34.78 | 34.78 | 34.78 |
| BF | 2.81 | 2.81 | 2.81 |
| d5 | 0.48 | 11.32 | 14.02 |
| d11 | 14.56 | 3.73 | 1.02 |
| d17 | 0.39 | 3.82 | 0.61 |
| d20 | 4.23 | 0.80 | 4.01 |

Zoom lens unit data

| Unit | First surface | Focal length |
|---|---|---|
| 1 | 1 | 17.89 |
| 2 | 6 | −1.79 |
| 3 | 12 | 4.49 |
| 4 | 18 | −6.33 |
| 5 | 21 | 6.62 |

(Numerical Embodiment 2)

Surface data

| Surface Number | r | d | nd | vd |
|---|---|---|---|---|
| 1 | 21.736 | 0.58 | 1.84666 | 23.8 |
| 2 | 12.105 | 2.19 | 1.49700 | 81.5 |
| 3 | −191.586 | 0.08 | | |
| 4 | 12.295 | 1.29 | 1.80400 | 46.6 |
| 5 | 36.371 | (Variable) | | |
| 6 | 12.597 | 0.27 | 1.88300 | 40.8 |
| 7 | 1.740 | 0.80 | | |
| 8 | −2.912 | 0.27 | 1.88300 | 40.8 |
| 9 | 9.701 | 0.08 | | |
| 10 | 5.817 | 0.96 | 1.92286 | 18.9 |
| 11 | −14.057 | (Variable) | | |
| 12 (Stop) | ∞ | 0.24 | | |
| 13* | 8.096 | 1.34 | 1.58313 | 59.4 |
| 14* | −6.559 | 0.09 | | |
| 15 | 13.132 | 1.16 | 1.54928 | 62.9 |
| 16 | −3.757 | 0.27 | 1.84666 | 23.8 |
| 17 | −7.235 | (Variable) | | |
| 18 | −5.626 | 0.77 | 1.66443 | 33.2 |
| 19 | −3.006 | 0.38 | 1.58313 | 59.4 |
| 20* | 9.042 | (Variable) | | |
| 21 | 14.947 | 0.53 | 1.48749 | 70.2 |
| 22 | −12.933 | 0.08 | | |
| 23 | 3.898 | 0.33 | 1.84666 | 23.8 |
| 24 | 2.300 | 0.20 | | |
| 25 | 3.420 | 0.62 | 1.69680 | 55.5 |
| 26 | −53.262 | 1.10 | | |
| 27 | ∞ | 1.04 | 1.51633 | 64.2 |
| 28 | ∞ | 1.02 | | |
| Image plane | ∞ | | | |

Aspherical Surface data

Thirteenth surface $K = -2.14345e+000$ $A4 = -4.28672e-004$ $A6 = 2.11439e-004$
$A8 = -3.05526e-005$ $A10 = 2.86864e-006$ Fourteenth surface $K = -2.01759e+000$ $A4 = -3.84325e-004$ $A6 = 1.10427e-004$
$A8 = -5.95803e-006$ Twentieth surface $K = -3.61568e+001$ $A4 = 3.11685e-003$ $A6 = -1.27172e-003$
$A8 = 1.54279e-004$

Various data
Zoom ratio 67.20

| | | | |
|---|---|---|---|
| Focal length | 1.00 | 12.39 | 67.20 |
| F number | 2.02 | 2.75 | 6.53 |
| Half field angle | 32.43 | 2.94 | 0.54 |
| Image height | 0.64 | 0.64 | 0.64 |
| Total lens length | 35.72 | 35.72 | 35.72 |
| BF | 2.80 | 2.80 | 2.80 |
| d5 | 0.63 | 11.46 | 14.17 |
| d11 | 14.59 | 3.76 | 1.05 |
| d17 | 0.40 | 4.07 | 0.60 |
| d20 | 4.74 | 1.07 | 4.54 |

Zoom lens unit data

| Unit | First surface | Focal length |
|---|---|---|
| 1 | 1 | 17.79 |
| 2 | 6 | −1.66 |
| 3 | 12 | 4.52 |
| 4 | 18 | −6.29 |
| 5 | 21 | 6.93 |

(Numerical Embodiment 3)

Surface data

| Surface Number | r | d | nd | vd |
|---|---|---|---|---|
| 1 | 21.759 | 0.58 | 1.84666 | 23.8 |
| 2 | 12.014 | 2.03 | 1.49700 | 81.5 |
| 3 | −199.617 | 0.08 | | |
| 4 | 12.129 | 1.30 | 1.80400 | 46.6 |
| 5 | 34.753 | (Variable) | | |
| 6 | 10.023 | 0.28 | 1.88300 | 40.8 |
| 7 | 1.565 | 0.72 | | |
| 8 | −2.660 | 0.28 | 1.88300 | 40.8 |
| 9 | 11.367 | 0.08 | | |
| 10 | 5.588 | 1.01 | 1.94595 | 18.0 |
| 11 | −12.468 | (Variable) | | |
| 12 (Stop) | ∞ | 0.24 | | |
| 13* | 8.486 | 1.34 | 1.58313 | 59.4 |
| 14* | −6.493 | 0.09 | | |
| 15 | 15.221 | 1.16 | 1.58003 | 59.1 |
| 16 | −4.150 | 0.28 | 1.92286 | 18.9 |
| 17 | −7.171 | (Variable) | | |
| 18 | −4.928 | 0.73 | 1.70141 | 30.2 |
| 19 | −2.780 | 0.39 | 1.58313 | 59.4 |
| 20* | 9.155 | (Variable) | | |
| 21 | 26.583 | 0.49 | 1.48749 | 70.2 |
| 22 | −19.114 | 0.08 | | |
| 23 | 3.489 | 0.33 | 1.84666 | 23.8 |
| 24 | 2.192 | 0.20 | | |
| 25 | 3.212 | 0.62 | 1.69680 | 55.5 |
| 26 | −49.216 | 1.10 | | |
| 27 | ∞ | 1.04 | 1.51633 | 64.2 |
| 28 | ∞ | 1.02 | | |
| Image plane | ∞ | | | |

Aspherical Surface data

Thirteenth surface

K = −1.25686e+000 A 4 = −1.24495e−003 A 6 = 2.22124e−004
A 8 = −1.85188e−005 A10 = 9.86217e−007

Fourteenth surface

K = −1.63632e+000 A 4 = −4.61518e−004 A 6 = 1.38938e−004
A 8 = −5.85542e−006

Twentieth surface

K = −5.42386e+001 A 4 = 4.37219e−003 A 6 = −1.63338e−003
A 8 = 1.80053e−004

Various data
Zoom ratio 74.40

| Focal length | 1.00 | 12.79 | 74.40 |
|---|---|---|---|
| F number | 2.02 | 2.74 | 7.39 |
| Half field angle | 32.43 | 2.84 | 0.49 |
| Image height | 0.64 | 0.64 | 0.64 |
| Total lens length | 35.84 | 35.84 | 35.84 |
| BF | 2.81 | 2.81 | 2.81 |
| d 5 | 0.55 | 11.64 | 14.41 |
| d11 | 14.76 | 3.67 | 0.90 |
| d17 | 0.61 | 4.32 | 0.61 |
| d20 | 4.80 | 1.10 | 4.81 |

Zoom lens unit data

| Unit | First surface | Focal length |
|---|---|---|
| 1 | 1 | 17.90 |
| 2 | 6 | −1.63 |
| 3 | 12 | 4.49 |
| 4 | 18 | −6.01 |
| 5 | 21 | 7.08 |

(Numerical Embodiment 4)

Surface data

| Surface Number | r | d | nd | vd |
|---|---|---|---|---|
| 1 | 27.393 | 0.58 | 1.84666 | 23.8 |
| 2 | 12.412 | 2.07 | 1.49700 | 81.5 |
| 3 | −206.579 | 0.08 | | |
| 4 | 12.368 | 1.32 | 1.83400 | 37.2 |
| 5 | 33.551 | (Variable) | | |
| 6 | 9.736 | 0.27 | 1.88300 | 40.8 |
| 7 | 1.609 | 0.80 | | |
| 8 | −4.555 | 0.27 | 1.88300 | 40.8 |
| 9 | 6.486 | 0.08 | | |
| 10 | 3.966 | 1.02 | 1.94595 | 18.0 |
| 11 | 55.395 | (Variable) | | |
| 12 (Stop) | ∞ | 0.24 | | |
| 13* | 8.135 | 1.48 | 1.58313 | 59.4 |
| 14* | −7.930 | 0.09 | | |
| 15 | 229.353 | 1.28 | 1.56384 | 60.7 |
| 16 | −3.943 | 0.27 | 1.92286 | 18.9 |
| 17 | −5.701 | (Variable) | | |
| 18 | −4.330 | 0.94 | 1.66680 | 33.0 |
| 19 | −2.151 | 0.38 | 1.58313 | 59.4 |
| 20* | 6.521 | (Variable) | | |
| 21 | 16.616 | 0.54 | 1.48749 | 70.2 |
| 22 | −14.713 | 0.08 | | |
| 23 | 4.594 | 0.33 | 1.84666 | 23.8 |
| 24 | 2.564 | 0.20 | | |
| 25 | 3.604 | 0.73 | 1.69680 | 55.5 |
| 26 | −8.493 | 1.10 | | |
| 27 | ∞ | 1.04 | 1.51633 | 64.2 |
| 28 | ∞ | 1.02 | | |
| Image plane | ∞ | | | |

Aspherical Surface data

Thirteenth surface

K = 4.49444e−001 A 4 = −1.30577e−003 A 6 = 1.44949e−004
A 8 = −4.97456e−006 A10 = −1.43589e−009

Fourteenth surface

K = −1.90395e+000 A 4 = 2.48662e−004 A 6 = 1.52388e−004
A 8 = −5.95791e−006

Twentieth surface

K = −3.86255e+001 A 4 = 1.30237e−002 A 6 = −5.04705e−003
A 8 = 9.41838e−004

Various data
Zoom ratio 99.73

| Focal length | 1.00 | 14.18 | 99.73 |
|---|---|---|---|
| F number | 2.02 | 2.74 | 9.25 |
| Half field angle | 32.29 | 2.55 | 0.36 |
| Image height | 0.63 | 0.63 | 0.63 |
| Total lens length | 41.52 | 41.52 | 41.52 |
| BF | 2.80 | 2.80 | 2.80 |
| d 5 | 0.55 | 13.82 | 17.13 |
| d11 | 17.81 | 4.54 | 1.22 |
| d17 | 1.59 | 5.61 | 0.60 |
| d20 | 5.68 | 1.66 | 6.67 |

Zoom lens unit data

| Unit | First surface | Focal length |
|---|---|---|
| 1 | 1 | 20.56 |
| 2 | 6 | −1.73 |
| 3 | 12 | 5.05 |
| 4 | 18 | −4.73 |
| 5 | 21 | 5.22 |

(Numerical Embodiment 5)

Surface data

| Surface Number | r | d | nd | vd |
|---|---|---|---|---|
| 1 | 28.170 | 0.58 | 1.84666 | 23.8 |
| 2 | 12.607 | 2.20 | 1.49700 | 81.5 |
| 3 | −224.136 | 0.08 | | |
| 4 | 12.719 | 1.57 | 1.83400 | 37.2 |
| 5 | 36.393 | (Variable) | | |
| 6 | 11.033 | 0.27 | 1.88300 | 40.8 |
| 7 | 1.644 | 0.80 | | |
| 8 | −4.381 | 0.27 | 1.88300 | 40.8 |
| 9 | 5.849 | 0.08 | | |
| 10 | 4.048 | 1.03 | 1.94595 | 18.0 |
| 11 | −236.991 | (Variable) | | |
| 12 (Stop) | ∞ | 0.24 | | |
| 13* | 8.048 | 1.50 | 1.58313 | 59.4 |
| 14* | −7.802 | 0.09 | | |
| 15 | 470.053 | 1.29 | 1.56384 | 60.7 |
| 16 | −4.008 | 0.27 | 1.92286 | 18.9 |
| 17 | −5.918 | (Variable) | | |
| 18 | −4.475 | 0.90 | 1.66680 | 33.0 |
| 19 | −2.202 | 0.38 | 1.58313 | 59.4 |
| 20* | 6.847 | (Variable) | | |
| 21 | 14.338 | 0.55 | 1.48749 | 70.2 |
| 22 | −15.593 | 0.08 | | |
| 23 | 4.789 | 0.33 | 1.84666 | 23.8 |
| 24 | 2.548 | 0.20 | | |
| 25 | 3.409 | 0.75 | 1.69680 | 55.5 |
| 26 | −8.949 | 1.10 | | |
| 27 | ∞ | 1.04 | 1.51633 | 64.2 |
| 28 | ∞ | 1.02 | | |
| Image plane | ∞ | | | |

Aspherical Surface data

Thirteenth surface

K = 7.53430e−001 A 4 = −1.36674e−003 A 6 = 1.47635e−004
A 8 = −5.59185e−006 A10 = 7.29269e−008
Fourteenth surface K = −9.66373e−001 A 4 = 3.65370e−004 A 6 = 1.52783e−004
A 8 = −5.96449e−006
Twentieth surface K = −4.66020e+001 A 4 = 1.40050e−002 A 6 = −5.36914e−003
A 8 = 9.61917e−004

Various data
Zoom ratio 99.72

| Focal length | 1.00 | 14.18 | 99.72 |
|---|---|---|---|
| F number | 2.02 | 2.76 | 8.00 |
| Half field angle | 32.29 | 2.55 | 0.36 |
| Image height | 0.63 | 0.63 | 0.63 |
| Total lens length | 42.30 | 42.30 | 42.30 |
| BF | 2.80 | 2.80 | 2.80 |
| d 5 | 0.55 | 13.84 | 17.17 |
| d11 | 17.88 | 4.59 | 1.27 |
| d17 | 1.54 | 5.71 | 0.60 |
| d20 | 6.04 | 1.87 | 6.98 |

Zoom lens unit data

| Unit | First surface | Focal length |
|---|---|---|
| 1 | 1 | 20.74 |
| 2 | 6 | −1.73 |
| 3 | 12 | 5.14 |
| 4 | 18 | −4.95 |
| 5 | 21 | 5.22 |

TABLE 1

| Conditional expression | Numerical Embodiment | | | | |
|---|---|---|---|---|---|
| | 1 | 2 | 3 | 4 | 5 |
| (1) $|f1/f2|$ | 10.0 | 10.7 | 11.0 | 11.9 | 12.0 |
| (2) f5/fw | 6.62 | 6.93 | 7.08 | 5.22 | 5.22 |
| (3) f4/fw | −6.33 | −6.29 | −6.01 | −4.73 | −4.95 |
| (4) nd2 | 1.896 | 1.896 | 1.904 | 1.904 | 1.904 |
| (5) vd1 | 81.54 | 81.54 | 81.54 | 81.54 | 81.54 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-294300, filed Dec. 25, 2009, which is hereby incorporated by reference herein in its entirety.

What is claimed is:

1. A zoom lens, comprising, in order from an object side to an image side:
   a first lens unit having a positive refractive power;
   a second lens unit having a negative refractive power;
   a third lens unit having a positive refractive power;
   a fourth lens unit having a negative refractive power; and
   a fifth lens unit having a positive refractive power,
   wherein intervals between the first lens unit, the second lens unit, the third lens unit, the fourth lens unit, and the fifth lens unit are changed during zooming,
   wherein the following conditional expressions are satisfied:

$9.8 < |f1/f2| < 12.5$; and $5.0 < f5/fw < 7.5$;

where fw denotes a focal length of an entire system at a wide angle end, and fn denotes a focal length of an n-th lens unit.

2. A zoom lens according to claim 1, wherein the following conditional expression is satisfied:

$-6.5 < f4/fw < -4.5$.

3. A zoom lens according to claim 1, wherein the following conditional expression is satisfied:

$nd2 > 1.86$ where nd2 denotes an average refractive index of a material of a lens constituting the second lens unit.

4. A zoom lens according to claim 1, wherein the following conditional expression is satisfied:

$vd1 > 75$ where vd1 denotes an Abbe number of a material of at least one positive lens of the first lens unit.

5. A zoom lens according to claim 1, wherein the fourth lens unit is moved to have a component in a direction perpendicular to an optical axis, and hence an imaging position is moved in the direction perpendicular to the optical axis.

6. An image pickup apparatus comprising:
   the zoom lens according to claim 1; and
   an image pickup element for receiving light of an image formed by the zoom lens.

* * * * *